United States Patent
Afshar

(10) Patent No.: US 10,035,100 B2
(45) Date of Patent: Jul. 31, 2018

(54) CARBON SCRUBBER

(71) Applicant: Reza Afshar, Westlake Village, CA (US)

(72) Inventor: Reza Afshar, Westlake Village, CA (US)

( * ) Notice: Subject to any disclaimer, the term of this patent is extended or adjusted under 35 U.S.C. 154(b) by 405 days.

(21) Appl. No.: 14/918,571

(22) Filed: Oct. 21, 2015

(65) Prior Publication Data

US 2017/0113174 A1   Apr. 27, 2017

(51) Int. Cl.
*B01D 53/02* (2006.01)
*B01D 53/04* (2006.01)
*B01D 53/26* (2006.01)
*B01D 53/72* (2006.01)
*B01D 53/82* (2006.01)

(52) U.S. Cl.
CPC ..... *B01D 53/0446* (2013.01); *B01D 53/0431* (2013.01); *B01D 53/266* (2013.01); *B01D 53/72* (2013.01); *B01D 53/82* (2013.01); *B01D 2253/102* (2013.01); *B01D 2257/306* (2013.01); *B01D 2257/708* (2013.01); *B01D 2257/80* (2013.01); *B01D 2257/90* (2013.01); *B01D 2258/06* (2013.01)

(58) Field of Classification Search
CPC ........ B01D 2253/102; B01D 2257/306; B01D 2257/708; B01D 2257/80; B01D 2257/90; B01D 2258/06; B01D 53/0431; B01D 53/0446; B01D 53/266; B01D 53/72; B01D 53/82
See application file for complete search history.

(56) References Cited

U.S. PATENT DOCUMENTS

| | | | | |
|---|---|---|---|---|
| 2,274,594 A * | 2/1942 | Donington | ............... | F01N 3/04 96/337 |
| 4,375,976 A * | 3/1983 | Potter | ............... | B01D 50/008 159/4.02 |
| 5,732,766 A * | 3/1998 | Hunter | ............... | B01D 46/003 165/111 |
| 6,241,809 B1 * | 6/2001 | Hopkins | ............... | B01D 45/06 55/DIG. 36 |
| 2003/0051309 A1 * | 3/2003 | Morgan | ............... | A47L 5/30 15/373 |
| 2009/0158928 A1 * | 6/2009 | Wu | ............... | B01D 53/265 95/115 |

* cited by examiner

*Primary Examiner* — Christopher P Jones
(74) *Attorney, Agent, or Firm* — Louis F. Teran

(57) ABSTRACT

Wastewater treatment and conveyance; and other chemical processes result in emission of a wide variety of odorous compounds. Contaminated exhaust air is typically a byproduct emitted from sludge in tanks and wells that are part of a wastewater treatment, conveyance, or chemical process. Said contaminated air has to be treated to capture or reduce odorous compounds or pollutants below human smell recognition threshold levels before the exhaust is discharged to the atmosphere. The present invention is a carbon scrubber used to treat and filter contaminated exhaust air produced in wastewater treatment and conveyance; and other chemical processes.

20 Claims, 6 Drawing Sheets

CARBON SCRUBBER

BACKGROUND OF INVENTION

Field of Invention

The present invention concerns a carbon scrubber used to treat and filter contaminated exhaust air produced in wastewater treatment and conveyance; and other chemical processes.

Description of Prior Art

Wastewater treatment and conveyance; and other chemical processes result in emission of a wide variety of odorous compounds, such as ammonia, organic sulfides, and volatile organic compounds hereinafter referred to as "VOCs"). Contaminated exhaust air is typically a byproduct emitted from sludge in tanks and wells that are part of a wastewater treatment, conveyance, or chemical process. Said contaminated air has to be treated to capture or reduce odorous compounds or pollutants below human smell recognition threshold levels and reduce VOCs levels before the exhaust is discharged to the atmosphere. Various technologies are currently used to treat said exhaust air, including: combustion; scrubbing with water, caustics, bleach, or other oxidants; filtration through filters; use of medias and microorganisms; dilution with fresh air; and dispersion.

A common system for treating exhaust is a carbon scrubber that directs the exhaust air into the base of a cylindrical tank. The exhaust air is forced to flow upwardly as it first contacts the bottom of a carbon based filter media. The exhaust air then percolates through the carbon media in the tank until it is discharged out the top of the tank. As the exhaust air percolates through the media, the unwanted contaminants and odorous compounds are removed. The limitations of this common system is caused by absorption capacity of the carbon media which is directly related to the surface area of the media perpendicular to the flow of the exhaust air and the thickness of the media in the direction of the flow of the exhaust air. The surface area of the media is limited by the overall size of the system. In addition, the larger the surface area, the larger the media, thus the more expensive the media. The thickness of the media is limited by the pressure required to push the exhaust air through it. In essence, the thicker the media, the larger the blower required to push the exhaust air and more power to maintain the desired flow rate. Therefore, the larger the surface area and thickness of the media, the larger the overall system. For high flow rates, the large footprint of the system can be prohibitory. Additionally, the larger the footprint of the system, the higher cost for material, labor, and space required for the installation.

Accordingly, a more efficient carbon scrubber is desired that would permit larger volumes of exhaust air to be treated in a smaller footprint. In addition, easy access into the scrubber will allow quick and easy replacement of the spent carbon and filter media.

SUMMARY OF THE INVENTION

Accordingly, the present invention has been made in view of the above-mentioned disadvantages occurring in the prior art. The present invention is a carbon scrubber that directs the exhaust air radially, rather than linearly, through a filter media for optimum filtration within a compact size.

It is therefore a primary object of the present invention to effectively filter the exhaust air while minimizing the footprint needed for the overall system.

Another object of the present invention is to redirect the flow of exhaust air radially through the filter media so that all particles of the exhaust air travel through the filter media for a minimum distance necessary for proper filtration.

Yet another object of the present invention is to provide a method of separating the moisture out of the exhaust air prior to filtration.

Yet another object of the present invention is to isolate the liquid from the moisture and the filter media so as not to wet or contaminate the filter media.

Yet another object of the present invention is to effectively drain the liquid from the moisture in the exhaust air without impacting the filtration process.

Yet another object of the present invention is to allow for a secondary filtration media that removes further contaminants from the exhaust air.

Yet another object of the present invention is to provide easy and quick access to the filter media for replacement or service.

The above objects and other features and advantages of the present invention, as well as the structure and operation of various embodiments of the present invention, are described in detail below with reference to the accompanying drawings.

DESCRIPTION OF THE DRAWINGS

The accompanying drawings which are incorporated by reference herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Reference will now be made to the drawings in which various elements of the present invention will be given numerical designations and in which the invention will be discussed so as to enable one skilled in the art and make use the invention.

Figure 1:
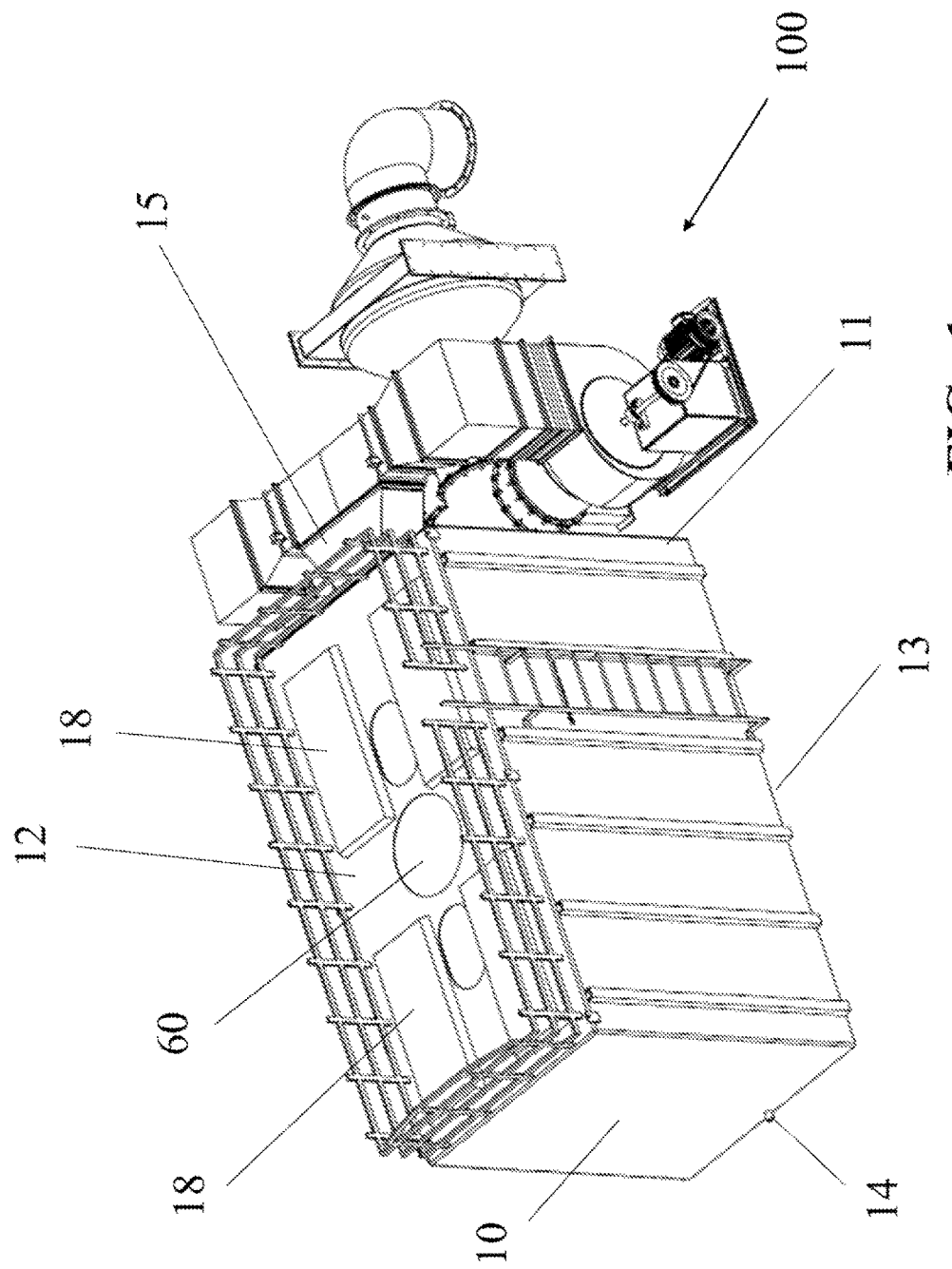
FIG. 1 is a perspective view of the carbon scrubber of the present invention.
Figure 2:
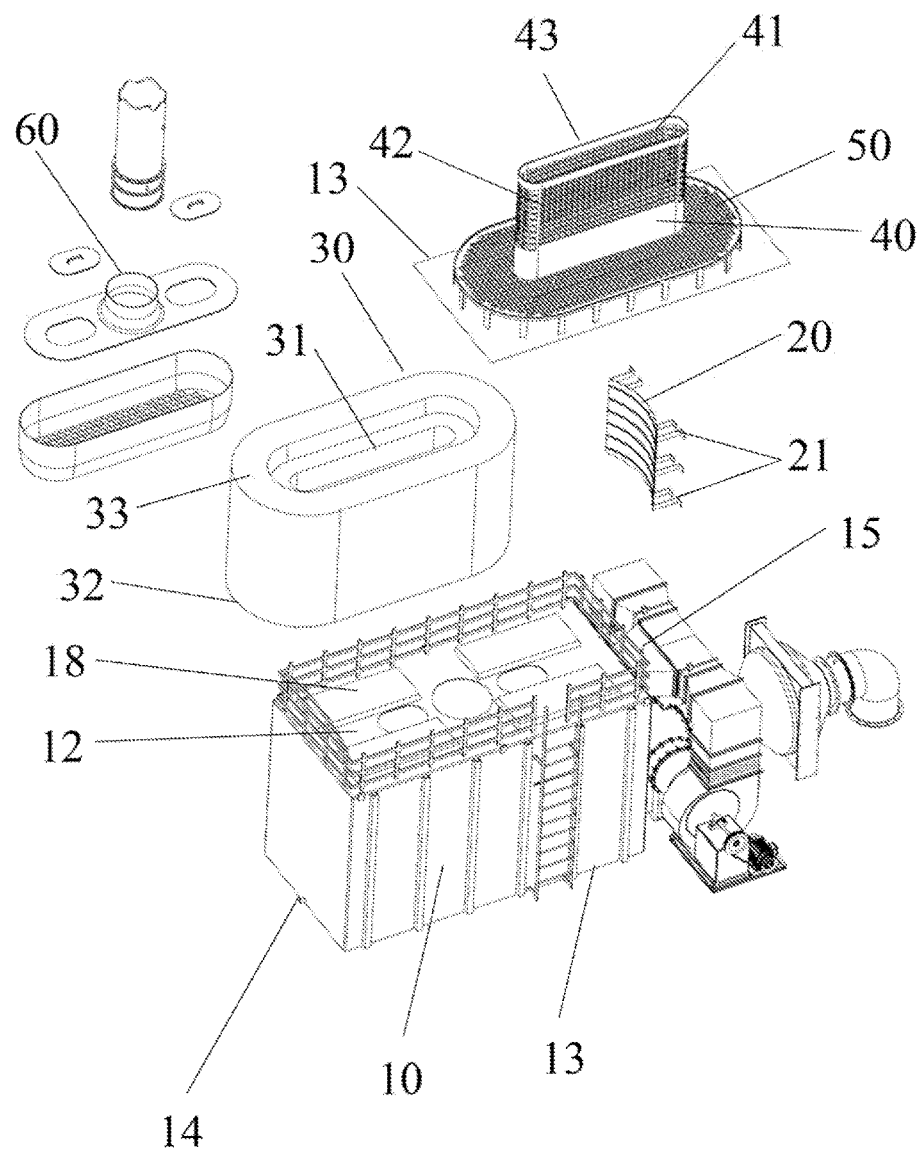
FIG. 2 is an exploded view of the carbon scrubber of the present invention.

The carbon scrubber 100 of the present invention comprises a housing 10, an air inlet 15, a deflector 20, a primary filter media 30, a secondary media housing 40, a secondary filter media, an elevated base 50, and an air outlet 60. FIG. 1 shows a perspective view of the carbon scrubber 100 of the present invention in its assembled state as it would be installed and ready for operation. FIG. 2 shows an exploded view of the carbon scrubber 100 of the present invention to depict in greater detail the various components that comprise the carbon scrubber 100.

Figure 3:
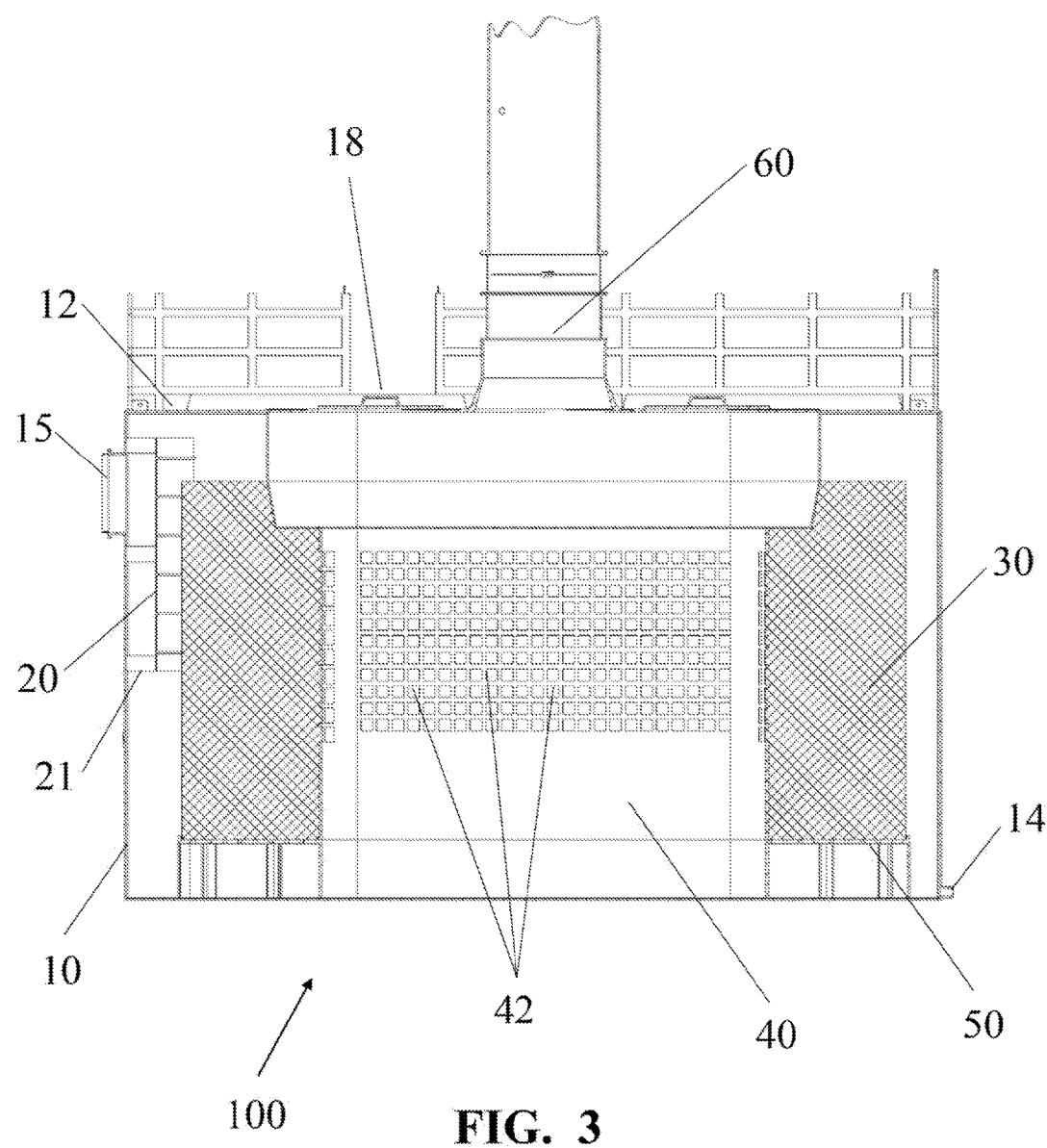
FIG. 3 is a sectional view of the carbon scrubber of the present invention.
Figure 4:
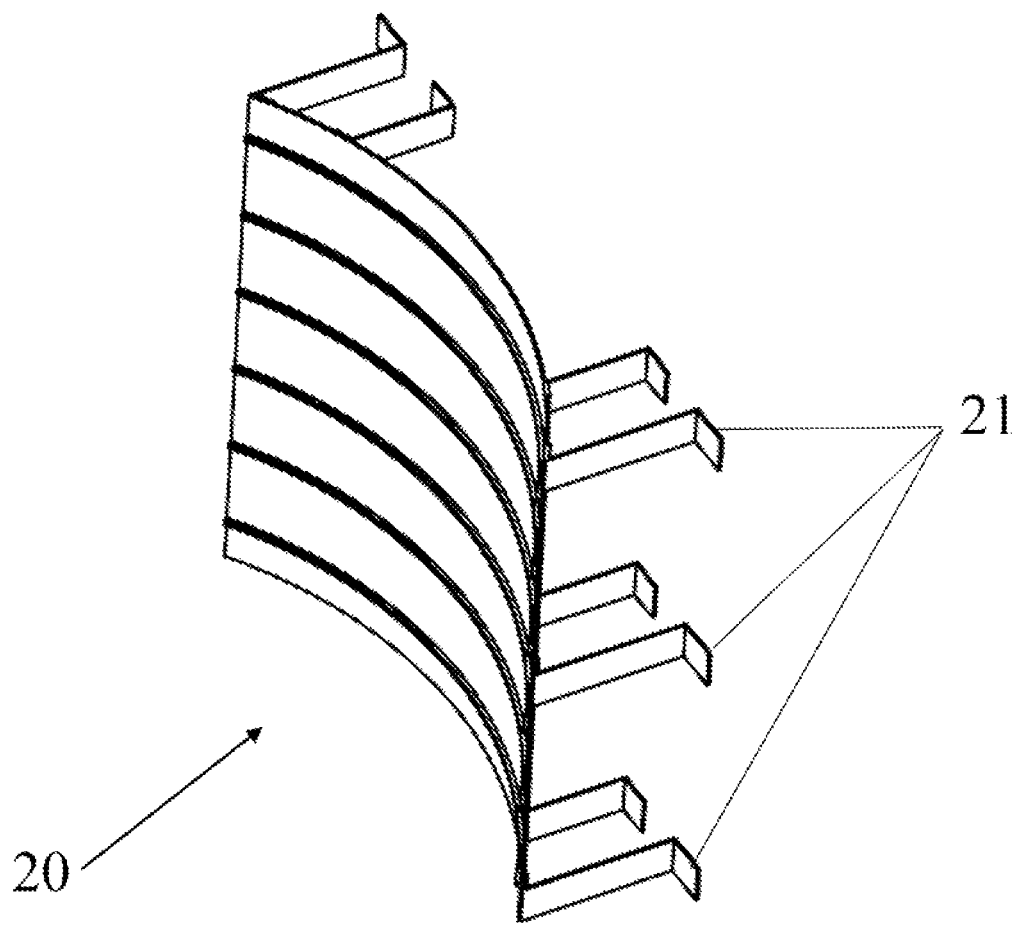
FIG. 4 is perspective view of the deflector of the present invention.

As shown in FIG. 3, the housing 10 has the air inlet 15 located on one of its side plates 11 and the air outlet 60 located at the top plate 12. As shown in FIG. 4, the deflector 20 is a barrier that is impermeable to liquid or gas, preferably made out of a thermoplastic material. The deflector 20 is shaped to contour the primary filter media 30 that is placed inside the housing 10. As shown in FIG. 3, the deflector 20 is placed in front of the air inlet 15 and attached to the corresponding side plate 11 of the housing 10. Attachment of the deflector 20 to the side plate 11 is accomplished with the plurality of posts 21 in the deflector 20. When the deflector 20 is attached to the side plate 11 of the housing 10, it is positioned at a predetermined distance away from the air inlet 15, as shown in FIG. 3.

The shape of the deflector 20 and its distance from the air inlet 15 are configured to allow the air entering the housing 10 through the air inlet 15 to be redirected towards the primary filter media 30. In addition, the shape of the deflector 20 and its distance from the air inlet 15 are configured to allow moisture in the air entering the housing 10 to be captured and separated from the air. As the moisture is collected on the deflector 20, the moisture is allowed to drip downward on to the bottom plate 13 of the housing 10 for subsequent drainage through a drain hole 14.

Figure 5:
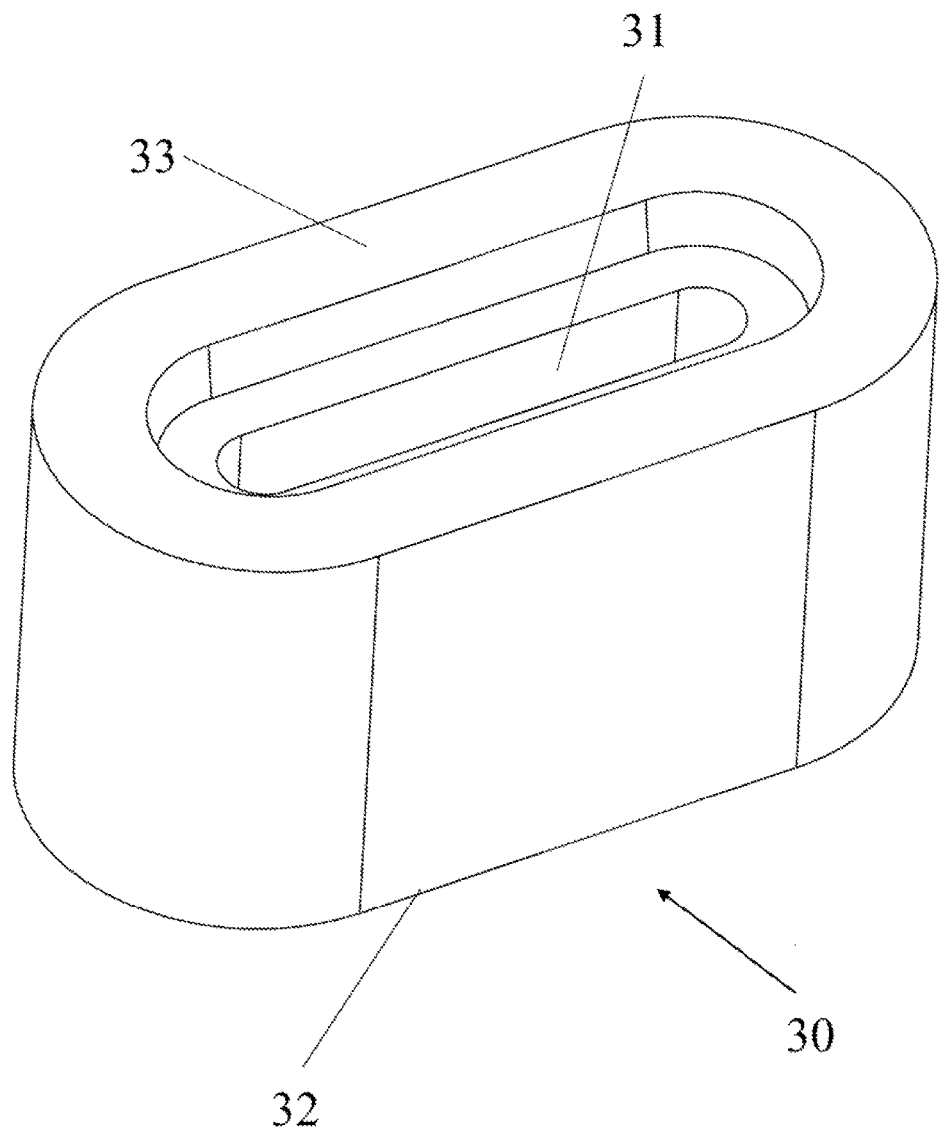
FIG. 5 is a perspective view of the primary filter media of the present invention.
Figure 6:
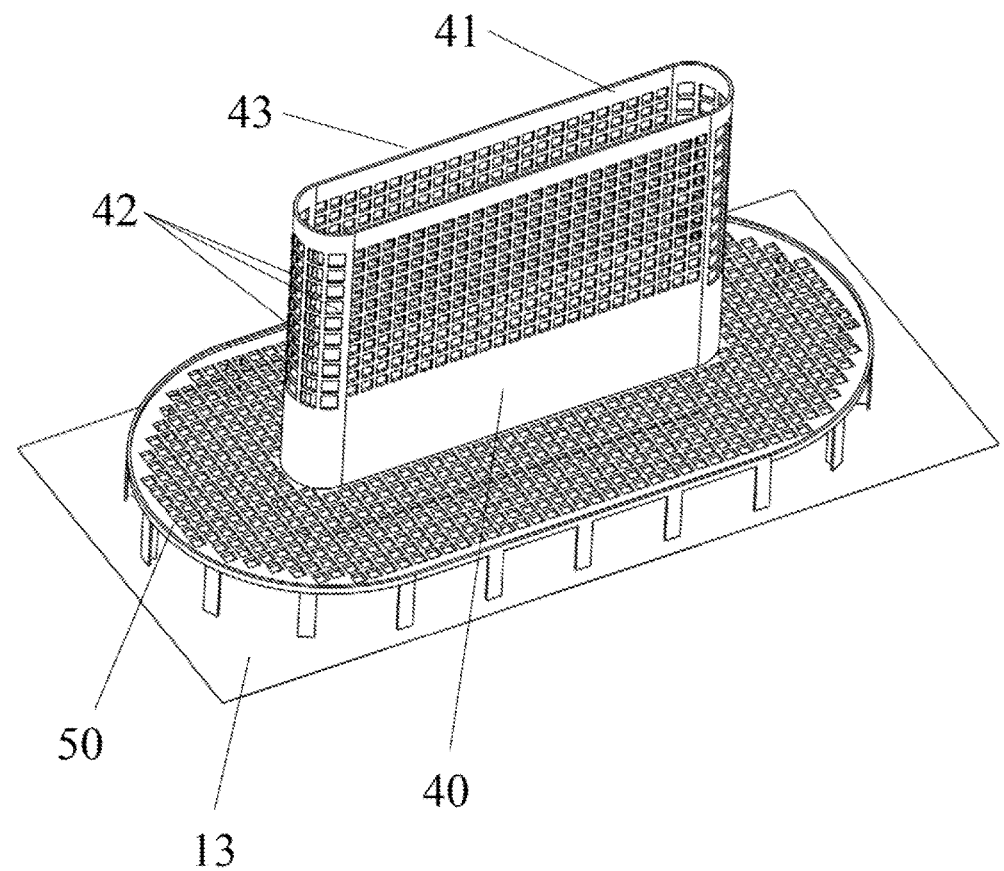
FIG. 6 is a perspective view of the secondary media housing of the present invention.

The primary filter media 30 is preferably configured with a hollow center 31, as shown in FIG. 5. This configuration allows air to be injected through any of the outer sides of the primary filter media 30. Once the air is filtrated by passing through the primary filter media 30, it is directed to the hollow center 31. The secondary media housing 40 is complementary in shape to the hollow center 31 of the primary filter media 30. Furthermore, the secondary media housing 40 is a shell with a hollow center 41 into which the secondary filter media is inserted. In addition, the secondary media housing 40 has a plurality of holes 42 perforated along the center at predetermined distance away from the top and bottom, as shown in FIG. 6. Therefore, air that is filtrated by the primary filter media 30 is directed through the holes 42 in the secondary media housing 40 and into the secondary filter media therewithin for further filtration. Thereafter, the air is pushed or sucked out through the top 43 of the secondary media housing 40 which is in communication with the air outlet 60 of the housing 10. Accordingly, air that enters the housing 10 through the air inlet 15 is first separated from any moisture by the deflector 20 and then undergoes double filtration, first by the primary filter media 30 and then by the secondary filter media, before it is exhausted out of the housing 10 through the air outlet 60.

The primary filter media 30 is placed on top of an elevated base 50 that keeps it at a predetermined distance above the bottom plate 13 of the housing 10, as shown in FIG. 3. In addition, the elevated base 50 raises the primary filter media 30 from the bottom plate 13 without inhibiting the air from flowing into the primary filter media 30 through its bottom face 32. Similarly, the top face 33 and side face 34 of the primary filter media 30 are uninhibited so as to allow the air to also flow into the primary filter media 30 therethrough. Allowing the air to flow 30 into the primary filter media 30 through any of its top, bottom, and side faces increases the surface area through which the air flows without increasing the footprint of the filter media. A disadvantage of the prior art is that the air is forced into the filter media through one of its faces and directs the flow of air in a linear direction across the filter media. Thus, increasing the surface area requires increasing the size of the face through which air flows which requires an increase in size of the entire filter media and the entire system. The present invention, however, allows the air to flow into the primary filter media 30 through any of its faces and directs the flow of air radially to the hollow center 31 rather than linearly to the opposite face. The novel and nonobvious manner in which the air is directed through the primary filter media 30 in the present invention allows the effective surface area of the filter media to be substantially larger than the prior art without increasing the size of the filter media or the overall system.

The height and width of the deflector 20 and the distance of the holes 42 from the top and bottom of the secondary media housing 40 are designed to conjunctively direct the air a predetermined minimum distance through the primary filter media 30 before it is passed through the holes 42. The predetermined minimum distance allows the air to be properly filtrated by the primary filter media 30 before it moves on to the secondary filter media. A disadvantage off the prior art is that the air is forced into the filter media through one of its faces and directs the flow of air in a linear direction across the thickness of the filter media. Thus, optimizing the filtration of the air requires increasing the thickness of the filter media which requires an increase in size of the system. The present invention, however, utilizes the size of the deflector 20 and the location of the holes 42 to optimize the flow path of the air within the primary filter media 30 to be a predetermined minimum distance. Therefore, the effective thickness of the filter media or the flow path of the air, in the present invention, can be optimized without having to increase the thickness of the filter media, thus the size of the system, as in the prior art.

In addition to redirecting the flow of air coming through the air inlet 15, the deflector 20 captures the moisture from the air and allows it to drip downward on to the bottom plate 13 of the housing 10. As the liquid from the moisture accumulates on the bottom plate 13, the primary filter media 30 is kept above said liquid bye the elevated base 50, thus, keeping the primary filter media 30 from getting wet or contaminated by the liquid from the moisture. A drain hole 14 attached to the bottom plats 13 drains the liquid from the moisture out of the housing 10. Under certain circumstances, the side plates of said housing 10 tend to accumulate moisture. To ensure that any moisture on said plates of said housing 10 is not transferred to any of the sides of said primary filter media 30, the carbon scrubber 100 of the present invention has a gap or space in between the plates of said housing 10 and the sides of said primary filter media 30. This gap or space prevents moisture from transferring from the plates of said housing 10 on to said primary filter media 30. In addition, said gap or space also allows the exhaust air to enter said primary filter media 30 for filtration through any of the sides of said primary filter media 30. Allowing the exhaust air to enter the primary filter media 30 through any of its sides, rather than a single side as in the prior art, increases the surface area through which the exhaust air if filtered.

A plurality of panels 18 on the top plate 12 of the lousing 10 allow accessibility to both the primary filter media 30 and the secondary filter media 45. Periodic replacement or service of the filter media through the panels 18 is preferred.

It is understood that the described embodiments of the present invention are illustrative only, and that modifications thereof may occur to those skilled in the art. Accordingly, this invention is not to be regarded as limited to the embodiments disclosed, but to be limited only as defined by the appended claims herein.

What is claimed is:

1. A carbon scrubber comprising:
   a housing having an air outlet, and an air inlet through which exhaust air enters said housing;
   a primary filter media having a hollow center;
   a deflector;
   a secondary media housing that is inserted into said hollow center and having a plurality of holes; and
   wherein said deflector directs said exhaust air to flow into said primary filter media and said secondary media housing retains said exhaust air within said primary filter media until said exhaust air flows through said plurality of holes before said exhaust air flows out of said housing through said air outlet.

2. The carbon scrubber according to claim 1 wherein said deflector captures moisture in said exhaust air.

3. The carbon scrubber according to claim 2 wherein said deflector directs said moisture to flow on to a bottom plate of said housing.

4. The carbon scrubber according to claim 1 wherein said deflector directs said exhaust air a predetermined distance through said primary filter media before passing through said air outlet.

5. The carbon scrubber according to claim 1 wherein said primary filter media has a plurality of sides through which said exhaust air can enter and flow radially toward said hollow center.

6. The carbon scrubber according to claim 1 further comprising a secondary filter media that filters said exhaust air after said exhaust air passes through said primary filter media.

7. The carbon scrubber according to claim 1 wherein said primary filter media is placed on a base that is elevated so as to keep said primary filter media above a bottom plate of said housing.

8. The carbon scrubber according to claim 6 wherein said secondary filter media is inserted into said hollow center.

9. The carbon scrubber of claim 1 wherein said primary filter media is placed within said housing without physically touching said housing so as to allow said exhaust air to flow into said primary filter media from any direction.

10. The carbon scrubber of claim 1 wherein said primary filter media is placed within said housing without physically touching said housing so as to prevent any moisture on said housing to be transferred to said primary filter media.

11. A carbon scrubber comprising:
    a housing having an air inlet,
    a deflector,
    a primary filter media having a hollow center;
    a secondary media housing that is inserted into said hollow center and having a plurality of holes; and
    wherein exhaust air enter said housing through said air inlet before it is directed by said deflector to flow into said primary filter media where it is retained by said secondary media housing until it flows through said plurality of holes.

12. The carbon scrubber according to claim 11 wherein said deflector captures moisture in said exhaust air.

13. The carbon scrubber according to claim 12 wherein said deflector directs said moisture to flow on to a bottom plate of said housing.

14. The carbon scrubber according to claim 11 wherein said deflector directs said exhaust air a predetermined distance through said primary filter media before passing through said plurality of holes.

15. The carbon scrubber according to claim 11 wherein said primary filter media has a plurality of sides through which said exhaust air can enter and flow radially toward said hollow center.

16. The carbon scrubber according to claim 11 further comprising a secondary filter media that filters said exhaust air after said exhaust air passes through said primary filter media.

17. The carbon scrubber according to claim 11 wherein said primary filter media is placed on a base that is elevated so as to keep said primary filter media above a bottom plate of said housing.

18. The carbon scrubber according to claim 16 wherein said secondary filter media is inserted into said hollow center.

19. The carbon scrubber of claim 11 wherein said primary filter media is placed within said housing without physically touching said housing so as to allow said exhaust air to flow into said primary filter media from any direction.

20. The carbon scrubber of claim 11 wherein said primary filter media is placed within said housing without physically touching said housing so as to prevent any moisture on said housing to be transferred to said primary filter media.

* * * * *